United States Patent Office 3,687,644
Patented Aug. 29, 1972

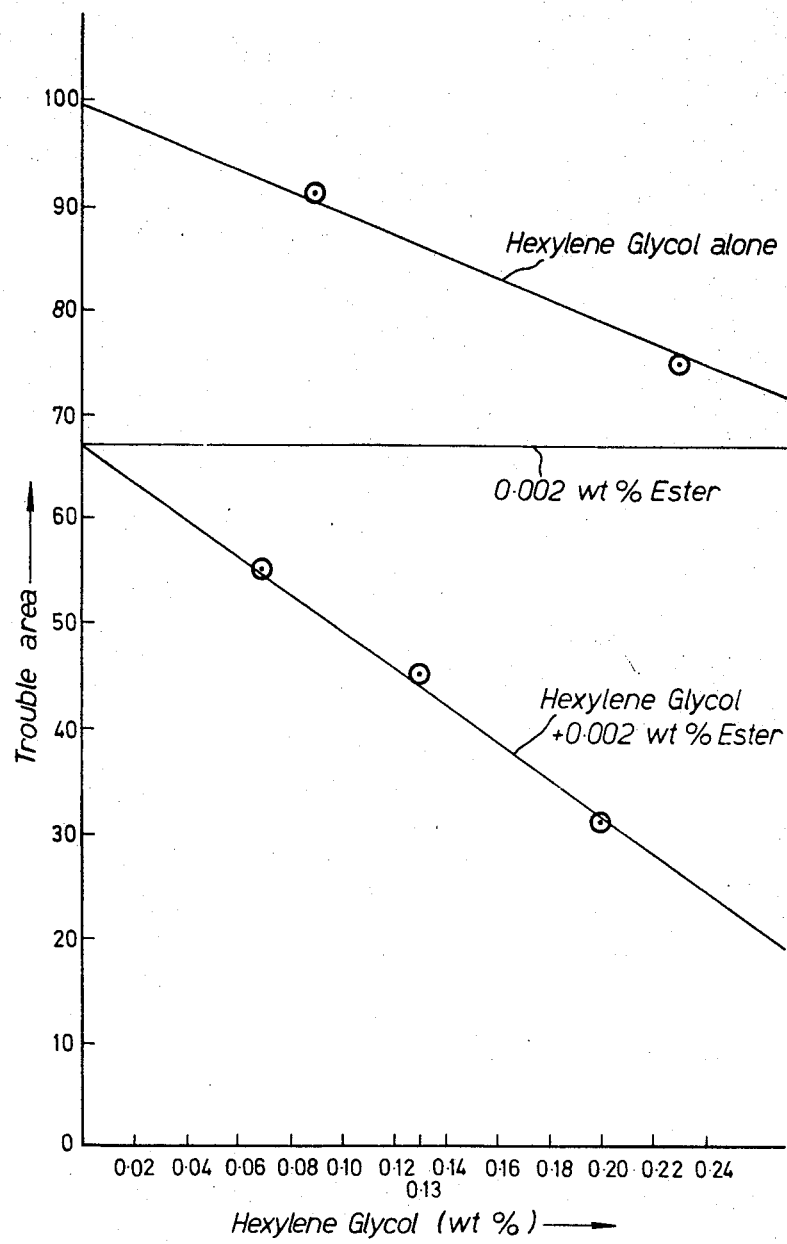

3,687,644
GASOLINE COMPOSITIONS
David J. Delafield, Abingdon, Alan H. Edwards, Wantage, and Keith Owen, Wallingford, England, assignors to Esso Research and Engineering Company
Filed May 28, 1970, Ser. No. 41,323
Claims priority, application Great Britain, June 6, 1969, 28,835/69
Int. Cl. C10l 1/18, 1/22
U.S. Cl. 44—56                29 Claims

ABSTRACT OF THE DISCLOSURE

Gasoline composition containing as anti-icing additives 0.00001% to 0.02% by weight of a mono- or poly-carboxylic acid, or an anhydride, ester, amide, imide thereof; and 0.01% to 5% by weight of an alcohol, glycol or polyol. Optionally, an ester of an alkoxylated phenol-aldehyde resin is also present. Concentrates of these additives are described.

---

This invention relates to gasoline compositions which contain anti-icing additives.

It has been previously known to add alcohols and glycols to gasolines so as to depress the freezing point of any water present in the gasoline, and also known to add certain surfactants to gasoline. However, we found that if certain alcohols or polyols and certain surfactants are added to gasolines in certain proportions there is an unexpected synergistic effect giving a gasoline composition having very good anti-icing properties.

According to this invention a gasoline composition comprises a major proportion by weight of a gasoline, 0.00001% to 0.2% by weight of additive (A) a mono- or poly-carboxylic acid, or an anhydride, ester amide or imide of such an acid; and 0.01% to 5% by weight of additive (B) an alcohol, glycol or polyol.

The gasoline can be a conventional gasoline for internal combustion engines, and these are supplied in a number of grades. Such gasolies may consist of mixtures of hydrocarbons of various types, including aromatics, olefins, paraffins, isoparaffins, naphthenes and sometimes diolefins. The gasolines are derived from petroleum by refining processes such as fractional distillation, thermal cracking, steam cracking, catalytic cracking, catalytic reforming, polymerisation, hydroforming, alkylation and isomerisation. Motor gasolines usually boil between 25° and 225° C. when tested by ASTM Method D 86. Their vapour pressures as determined by ASTM Method D 323 are varied, depending on the season of the year during which they are to be used, from about 6 to about 15 p.s.i. at 100° F. Their octane numbers as determined by ASTM Method D 908 may range from about 70 to 105 or higher.

Aviation gasolines are prepared by blending constituents similar to those found in motor gasolines but usually have narrower boiling ranges from about 37.5° C. to 165° C. and somewhat more rigid specifications than do motor gasolines.

When additive (A) is an acid or anhydride it is preferably one of the formulae $$R_1COOH; \quad \begin{matrix} R_1CX-(CH_2)_m-COOH \\ | \\ R_1{}^1CY-(CH_2)_n-COOH \end{matrix} ; \quad \begin{matrix} R_1\overset{O}{\overset{\|}{C}} \\ \diagdown \\ \diagup O \\ R_1\overset{\|}{\underset{O}{C}} \end{matrix}$$

(1)              (2)              (3)

or $$\begin{matrix} R_1CX-(CH_2)_m-\overset{O}{\overset{\|}{C}} \\ | \quad\quad\quad\quad\quad\quad \diagdown \\ \quad\quad\quad\quad\quad\quad\quad O \\ R_1{}^1CY-(CH_2)_n-\underset{O}{\overset{\|}{C}} \diagup \end{matrix}$$

(4)

where one of $R_1$ and $R_1{}^1$ is a hydrocarbyl group containing 10 to 35 carbon atoms, and the other is either a hydrocarbyl group containing 10 to 35 carbon atoms, or hydrogen; X and Y are hydrogen atoms or hydrocarbyl groups and $m$ is zero or an integer and $n$ is zero or an integer. In particular one of $R_1$ and $R_1{}^1$ is preferably an alkyl or an alkenyl group containing 12 to 20 carbon atoms and X and Y are preferably hydrogen atoms; the groups $R_1$, $R_1{}^1$, $x$ and $y$ can be straight or branched chain, cyclic or acyclic, and although they may be aromatic they are preferably aliphatic.

Suitable examples of acid (1) are oleic acid, stearic acid, palmitic acid, and lauric acid.

As examples of acid (2) one may use polypropenyl, or polyisobutenyl succinic acids, e.g. tetrapropenyl succinic acid.

Examples of anhydrides (3) and (4) include lauric anhydride and a polypropenyl succinic anhydride such as tetrapropenylsuccinic anhydride.

Alternatively additive (A) can be an ester of a mono- or poly-carboxylic acid, and such esters include the esters of acids (1) and (2) described above. These esters are preferably derived from a low boiling alcohol e.g. one containing 1 to 5 carbon atoms per molecule. Thus methyl, propyl, or pentyl esters can be used.

Suitable hydroxy compounds from which additive (A) is derived also include those of the formula $$HO[(CXY)_nCZ]_mR_2$$
$$\quad\quad\quad\quad |$$
$$\quad\quad\quad\quad OH$$

where X, Y and Z are hydrocarbyl groups or hydrogen atoms and $m$ is zero or an integer and $n$ is zero or an integer, and $R_2$ is a hydrocarbyl group containing 1 to 20 carbon atoms, or a hydrocarbyl group containing 1 to 20 carbon atoms and also one or more ether linkages, or may be hydrogen if both $m$ and $n$ are integers.

Particularly suitable alcohols are monohydric alcohols containing from 4 to 12 carbon atoms per molecule. Thus suitable alcohols from which additive (A) is derived include butanol-1, pentanol-1, isooctanol, isodecanol or dodecanol-1. If desired, however, the additive can be derived from a glycol, e.g. one containing 2 to 20 carbon atoms, for example ethylene glycol, butylene glycols, pinacone, tetra-methylene glycol etc. in which case one mole of glycol reacts with two moles of acid or anhydride.

Aromatic alcohols, e.g. benzyl alcohol, toluyl alcohol may also be used; as may phenolic compounds, such as phenol itself, the cresols, xylols or catechol.

Another suitable class of mono-hydroxy compounds are ether-alcohols which are for example obtained by reacting aliphatic alochols with an alkylene oxide. Suitable ether alcohols contain for example 2 to 20 carbon atoms per molecule, and include methoxy-methanol, ethoxy butanol, or ethoxyethanol.

Additive (A) may alternatively be an amide or imide of a mono- or poly-carboxylic acid, and therefore suitable amino compounds from which it may be derived include p-, s- or t- monoamines, diamines, polyamines, or hydroxyamino compounds.

Suitable amino compounds include amines of the formula

where $R_3$ and $R_4$ are alkyl, alkaryl or alkenyl groups containing 1 to 25 carbon atoms, or hydroxy or amino substituted alkyl or alkaryl groups containing 1 to 25 carbon atoms, or $R_3$ or $R_4$ is a hydrogen atom. When reacted with a monocarboxylic acid, amides of the following formula are formed

where $R_1$ is as defined previously. At least one of the groups $R_1$, $R_3$ and $R_4$ should contain at least 10 carbon atoms, particularly between 12 and 20 carbon atoms.

Suitable monoamines are those of the formula $R_3NH_2$, or $R_3R_4NH$ where $R_3$ and $R_4$ are hydrocarbyl or substituted hydrocarbyl e.g. alkyl, cyclo alkyl, aryl, alkenyl, substituted aryl or heterocyclic radicals. Thus, the groups $R_3$ or $R_4$ can be for example octyl, nonyl, decyl, undecyl, pentadecyl, hexadecyl, octadecyl, eicosyl, octadecenyl, or octadecadienyl.

The groups $R_3$ or $R_4$ can vary widely, and may for example contain from 1 to 30 carbon atoms, preferably 8 to 22 carbon atoms.

Aromatic monoamines include aniline, substituted anilines, benzylamine and naphthylamine. Suitable heterocyclic amines include furyl amine, piperidine and N-vinyl pyrrolidone.

Suitable polyamines which can be used include aliphatic polyamines, and heterocyclic polyamines. The preferred polyamines are alkylene polyamines, and hydroxy alkylene polyamines.

Thus, suitable polyalkylene polyamines are those compounds having the formula $H_2N(RNH_2)_yH$ where R is an alkylene radical or a hydrocarbyl substituted alkylene radical and $y$ is an integer. Thus, suitable polyamines are diethylene triamine, triethylene tetramine, or tetra-ethylene pentamine.

The hydroxyamino compounds which may be used include monohydroxyamines of the formula

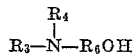

dihydroxyamines of the formula

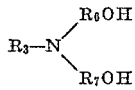

or trihydroxyamines of the formula

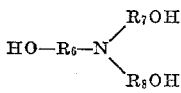

where $R_3$ and $R_4$ are hydrogen or hydrocarbyl groups and $R_6$, $R_7$ and $R_8$ are divalent hydrocarbons, e.g. alkylene groups.

Thus, the groups $R_3$ and $R_4$ may be alkenyl, alkyl, cycloalkyl, or phenyl groups and the groups $R_6$, $R_7$ and $R_8$ may be alkylene groups of the formula $-(CH_2)_x-$ where $x$ is preferably a whole number from 1 to 8.

In general the hydroxyamino compounds should preferably contain from 1 to 25 carbon atoms.

Particularly suitable are monoalkanolamines, especially where the nitrogen atom is substituted by alkyl groups, e.g. monoalkanolamines of the formula

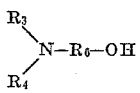

where $R_3$ and $R_4$ are alkyl groups, e.g. $C_1$ to $C_9$ alkyl groups and $R_6$ is an alkylene group, e.g. a $C_2$ to $C_{10}$ alkylene group. Thus, one may use N,N diethyl ethanolamine or N,N dibutyl hexanolamine.

Also suitable are monoalkanolamines in which one or more of the alkyl groups also contains an amino substituent, i.e. amino alkyl monoalkanolamines, e.g. amino ethyl ethanolamine, amino propyl ethanolamine, amino propyl butanolamine, etc. One may of course use analogous amino alkyl dialkanolamines, e.g. N-amino ethyl diethanolamine.

The additive is preferably an amide, imide or ester of a succinic acid or anhydride which has been substituted by one or more hydrocarbyl groups. Particularly suitable hydrocarbyl groups are alkenyl or alkyl groups, e.g. those containing from 3 to 30 carbon atoms, especially 10 to 18 carbon atoms.

Thus, the substituted succinic acid can be represented by the general formula

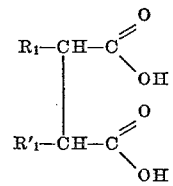

where one of $R_1$ and $R_1'$ is hydrogen, and the other is an alkenyl group. The alkenyl group can be straight-chain or branched chain and is preferably derived from a polyolefin, e.g. polypropenyl, polyisobutenyl or polypentenyl, and preferably of MW 100 to 250. Instead of being substituted by a hydrocarbyl group this substituent group can be a hydrocarbyl group which itself is substituted by a small proportion (e.g. less than 10%) of other atoms or groups, e.g. halogen atoms or nitro groups.

The corresponding anhydride, or ester can also be used. If an ester, is preferably derived from a low boiling alcohol, e.g. one containing 1 to 5 carbon atoms per molecule. Thus, the methyl, ethyl, propyl, butyl or pentyl esters should preferably be used.

One of the preferred additives (A) for use in the gasoline compositions of this invention are esters represented by the formula

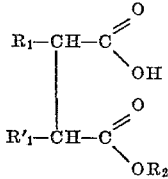

where either one of the groups $R_1$ and $R_1'$ is an alkenyl group containing from 10 to 30 carbon atoms and the other of the groups $R_1$ and $R_1'$ is a hydrogen atom, and $R_2$ is $C_4$ to $C_{12}$ alkyl group, or the group

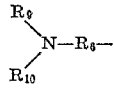

wherein $R_9$ and $R_{10}$ are $C_1$ to $C_9$ alkyl groups and $R_6$ is a $C_2$ to $C_{10}$ alkylene group, the total number of carbon atoms in the groups $R_9$, $R_{10}$ and $R_6$ being from 4 to 10.

The mono-ester may conveniently be prepared by reaction of equimolar proportions of the substituted succinic acid or its anhydride with a mono-hydroxy compound. Usually simple admixture is sufficient, but when reacting a hydroxyamine with the substituted anhydride heating may be necessary.

Depending on the reactants used and the quantities used therefore, additive (A) can be a mono-, di- or polyester, a mono- or di-amide, or an imide. Methods for preparing such imides are well-known to the prior art. See, for example, U.S. Pat. No. 3,443,918 to Kautsky et al.

If desired the gasoline compositions of this invention may include mixtures of two or more of the above described additives (A).

As stated previously the total number of carbon atoms in the acid must be between 8 and 39 carbon atoms.

Preferably this total number of carbon atoms lies between 10 and 24.

Additive (B) of the gasoline composition is an alcohol, glycol or polyol, saturated compounds being preferred.

Suitable alcohols include $C_1$ to $C_{20}$, in particular $C_1$ to $C_6$ for example $C_1$ to $C_4$ alcohols. Preferred alcohols are methanol, ethanol, n-propanol, isopropanol, isobutanol, n-hexanol, $C_8$ to $C_9$ oxoalcohols.

Suitable glycols include those containing between 2 and 10 carbon atoms per molecule, especially those having 6 to 8 carbon atoms per molecule. In particular suitable glycols are those having an alkyl group (preferably $C_1$ to $C_4$ alkyl) attached to one or both of the carbon atoms to which a hydroxyl group is attached. Examples of such glycols are 2-methyl-2,4-pentane diol, hexane diol, hexane diol-2,5, and 2-methyl-pentene-5-diol-2,4. Especially preferred of the hexylene glycols is 2-methyl-2,4-pentane diol. Other glycols which may be used include 1,3 dimethyl-butane-diol 2,3 and 2-methyl-pentane diol 1,3.

Also suitable are the polyglycols which may be represented by the general formula

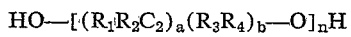

$$HO-[(R_1R_2C_2)_a(R_3R_4)_b-O]_nH$$

where $R_1$, $R_2$, $R_3$ and $R_4$ are hydrocarbyl groups or hydrogen atoms and $a$, $b$ and $n$ are integers. Thus, if $R_1$, $R_2$, $R_3$ and $R_4$ are all hydrogen atoms and $a$ and $b$ are both one the glycol is a polyethylene glycol, and if one of $R_1$, $R_2$, $R_3$ and $R_4$ is methyl and the others are hydrogen atoms and $a$ and $b$ are both one the glycol is a polypropylene glycol. Preferred are the polyethylene and polypropylene glycols were $n$ is an integer between 2 and 10 e.g. dipropylene glycol and tri-ethylene glycol.

Suitable polyols where there are three or more hydroxyl groups per molecule include trimethylol propane, pentaerythritol, sorbitol, mannitol.

The preferred amounts of additives (A) and (B) incorporated in the gasoline are 0.00015% to 0.0075% by weight of (A) and 0.03% to 2.0% by weight of (B).

If desired the gasoline composition of this invention may include a third additive (C) which is an ester of an alkoxylated phenol-aldehyde resin.

The phenol from which the ester of alkoxylated phenol-aldehyde resin (C) is derived may contain a substituent such as a hydrocarbyl or a substituted hydrocarbyl group or an acyl group. This substituent may be in the para position with respect to the phenolic group, but can however be in the meta -or ortho positions. Substituted hydrocarbyl groups may be hydrocarbyl groups substituted with, for example, halogen atoms. Preferably the hydrocarbyl group is unsubstituted. This hydrocarbyl group can be an alkyl group, e.g. a branched chain alkyl group, but can also be, for example, an alkenyl group. Particularly suitable substituted or unsubstituted hydrocarbon groups are those containing between 1 and 30 carbon atoms, e.g. methyl, t-butyl, hexyl, decyl, tetradecyl, octadecyl or stearyl, eicosyl, tetracosyl, hexacosyl or mixtures of these groups.

In preparing the phenol-aldehyde resin the phenol is condensed with an aldehyde. The aldehyde is preferably formaldehyde, or para formaldehyde but other aldehydes, especially those containing not more than 25, e.g. less than 8 carbon atoms per molecule could be used instead, e.g. acetaldehyde, butyraldehyde, benzaldehyde, or propionaldehyde. Furfuraldehyde may also be employed.

The phenol-aldehyde resin from which the ester is prepared may be prepared by methods well known in the art.

When the phenol-aldehyde resin is derived from phenol itself, a particularly suitable method of preparation is that given in "Preparative Methods of Polymer Chemistry," Interscience Publishers Inc., New York, by Sorenson and Campbell, page 295 (1961 ed.) i.e. heating together phenol and aldehyde in the presence of an acid catalyst. When reacting phenol with the aldehyde it is preferred that 0.6–0.95 moles of aldehyde be employed to every mole of phenol.

In order to alkoxylate the phenol-aldehyde resin thus obtained one reacts the resin with an alkylene oxide. Preferably the alkylene oxide contains not more than 4 carbon atoms per molecule, e.g. ethylene oxide, propylene oxide or butylene oxide.

The resin may be reacted with the alkylene oxide in the presence of a catalyst, e.g. an alkaline catalyst such as sodium acetate, sodium hydroxide or sodium methylate. The amount of alkaline catalyst may be small, e.g. between 0.1% and 2% by weight. The reaction may take place under pressure e.g. up to pressures of 20 atmospheres, and the reaction temperature may be as high as 200° C. The alkylation is conveniently carried out in the presence of an inert solvent, e.g. xylene, decalin, or diethyl ether. Usually the quantity of alkylene oxide reacted is from 1 to 2 moles per hydroxyl radical in the resin.

Finally, to prepare the ester (C) the alkoxylated phenol-aldehyde resin is reacted with a carboxylic acid. Especially suitable are mono-carboxylic acids containing between 8 and 32 carbon atoms per molecule, e.g. the higher fatty acids. Thus, saturated fatty acids include lauric acid, myristic acid, palmitic acid and stearic acid; whilst unsaturated fatty acids include oleic acid, linoleic acid and linolenic acid. One may of course use a mixture of acids, e.g. mixed fatty acids such as the fatty acids obtained from the hydrolysis of cottonseed oil, or soya bean oil.

Instead of reacting the alkoxylated resin with a carboxylic acid one can use, for example, the corresponding acyl chloride or anhydride; or in some cases one may employ transesterification.

Generally one reacts about one equivalent of carboxylic acid per hydroxy group in the resin.

In one typical preparation of Additive (C), slightly less than molar quantities of para-formaldehyde were reacted with p-t-butyl phenol at 385° F. in a heavy aromatic naphtha solvent system. After the reaction was completed the solvent was adjusted to give a solution containing about 50 wt. percent phenol-HCHO resin, the resin then being neutralised with excess HaOH. The solution was then ethoxylated by reacting with ethylene oxide (1.6 gm. oxide per 1 gm. of resin solution). After neutralisation with naphthenic acid and adjustment of the pH to about 2 to 3 with dodecyl benzene sulphonic acid the ethoxylated resin solution was reacted with palmitic acid to form the ester.

Additive (C) may if desired also incorporate a homopolymer of an alkylene oxide (e.g. ethylene oxide, propylene oxide) or a copolymer of alkylene oxides (e.g., ethylene and propylene oxides) formed by reaction with an alkanolamine, e.g. an alkanolamine such as methanolamine, or a dialkanolamine, e.g., dipropanolamine. The production of such polymers is known to the art; see, for example, U.S. Pat. 1,923,178. Such a polymer is simply mixed with the ester of the alkoxylated phenol-aldehyde resin. If this is done, additive ($C^1$) results.

The preferred amount of additive (C) or ($C^1$) added to the gasoline is 0.000005% to 0.025% by weight, especially about 0.00025% by weight.

The additives (A), (B) and (C) or ($C^1$) may if desired be dissolved in a diluent, e.g. toluene, kerosine or xylene. The concentration may be, for example, around 25 to 75 wt. percent, e.g. 50 wt. percent.

The gasoline may also incorporate other additives such as anti-knock agents, e.g. tetra ethyl lead, halohydrocarbon scavengers, e.g. ethylene dibromide or ethylene dichloride, or deposit modifiers, e.g. organic ester or oxy acids of phosphorus, or antioxidants e.g. 2,4-dimethyl-6-t-butyl phenol and $N,N^1$ di sec-butyl para phenylene diamine.

Conveniently concentrates of the additives can be prepared, for example 0.5 to 20.0 wt. of (A), 80.0 to 99.5 wt. percent of (B) and 0 to 1.0 wt. percent inclusive of (C) or (C¹) diluted with 0 to 80.0 wt. percent of a solvent.

EXAMPLE

A Mercedes Benz 190 c. car was run on a chassis dynamometer installed in a controlled climate chamber. The temperature was controlled to within ±0.5° C. The relative humidity of the air fed to the car's carburettor was controlled to within ±1.0%.

The car engine's idling speed was adjusted to the makers recommendation of 750 r.p.m.

The standard test cycle employed for all tests was as follows:
(1) Engine started with starter button of the auxiliary starter-curburettor in warm-up position (maintained for whole of test).
(2) 30 seconds idling.
(3) Acceleration through first three gears and then constant speed of 50 k.p.h. for *total* time of 45 seconds.
(4) 30 seconds idle.
(5) Repeat steps 3 and 4, nine times with total time in step 3 of 30 seconds.

A test gasoline having properties described in Table I was used and the car operated over a wide range of air temperatures and humidities. A "trouble area" was subsequently drawn on a temperature vs. relative humidity graph within which the car stalled during the test cycle. Stalling indicated throttle-plated icing in the carburettor.

TABLE I
Inspection data of test fuel

| | |
|---|---|
| Spec. grav. at 15/4 | 0.745 g./ml. |
| R.V.P | 0.70 kg./cm.² |
| ASTM-distillation: | |
| I.B.P | 31° C. |
| 5 vol. percent at | 42° C. |
| 10 vol. percent at | 47.5° C. |
| 20 vol. percent at | 55.5° C. |
| 30 vol. percent at | 63.5° C. |
| 40 vol. percent at | 74° C. |
| 50 vol. percent at | 88.5° C. |
| 60 vol. percent at | 107° C. |
| 70 vol. percent at | 124° C. |
| 80 vol. percent at | 135.5° C. |
| 90 vol. percent at | 147.5° C. |
| 95 vol. percent at | 157° C. |
| F.B.P | 157° C. |
| At 70° C | 37 vol. percent. |
| At 100° C | 56.5 vol. percent. |
| Res | 1 vol. percent. |
| Loss | 0.5 vol. percent. |
| FIA-analysis: | |
| Aromatics | 36 vol. percent. |
| Olefins | 26 vol. percent. |
| Saturates | 38 vol. percent. |

The procedure was repeated using the same test gasoline having small quantities of hexylene glycol and the monoester formed by reacting tetra-propenyl succinic anhydride with N,N diethyl ethanolamine (referred to below as "ester").

The anti-icing properties of the gasolines were then compared by comparing the areas enclosed on the temp./rel. humidity plot, within which the car stalled.

The results are described below:

TABLE II

| Test engine with: | | | | | | |
|---|---|---|---|---|---|---|
| Ester (wt. percent) | | 0.002 | 0.002 | 0.002 | | 0.002 |
| Hexylene glycol (wt. percent) | | 0.091 | 0.23 | | 0.07 | 0.13 | 0.20 |
| Trouble area, percent | 100 | 95 | 75 | 67 | 55 | 45 | 31 |
| Percent improvement by additives | | 5 | 25 | 33 | 45 | 55 | 69 |

These results show that the mixture of additives gives a synergistic effect—more clearly demonstrated when the results are plotted as in the figure. If no synergism were present the slopes of (i) the hexylene glycol and (ii) hexylene glycol+fixed concentration of ester plots would be equal.

In practice, taking for example the case where 0.13 wt. percent hexylene glycol is used, the slope of the hexylene glycol+0.002 wt. percent "Ester" plot shows a 22% reduction in Trouble Area vesus 11% reduction in Trouble Area for hexylene glycol alone. Thus synergism is clearly exhibited.

We claim:
1. A gasoline composition comprising a major proportion by weight of a gasoline, 0.00001% to 0.02% by weight of additive (A) which is selected from the group consisting of poly-carboxylic acids of the formula:

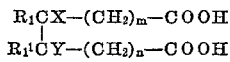

anhydrides of the formula:

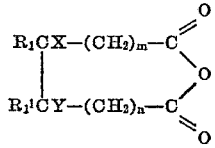

organic esters derived from said acid and a hydroxy compound of the formula:

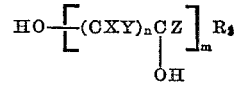

or a hydroxyamine of the formulae:

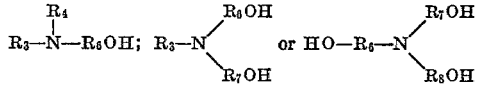

and amides or imides derived from said acid and mono-amines or polyalkylene amines of the formulae: $R_3NH_2$, $R_3R_4NH$, or $H_2N(RNH_2)_yH$; wherein one of $R_1$ and $R_1^1$ is a hydrocarbyl group containing 10 to 35 carbon atoms, and the other is either a hydrocarbyl group containing 10 to 35 carbon atoms, or hydrogen; X, Y and Z are hydrogen atoms or hydrocarbyl groups; $m$ is zero or an integer and $n$ is zero or an integer; and $R_2$ is a hydrocarbyl group containing 1 to 20 carbon atoms, or a hydrocarbyl group containing 1 to 20 carbon atoms and also one or more ether linkages, or a hydrogen atom if both $m$ and $n$ are integers; $R_3$ and $R_4$ are hydrogen or hydrocarbyl groups; and $R_6$, $R_7$ and $R_8$ are divalent hydrocarbyl groups; R is an alkylene radical or a hydrocarbyl substituted alkylene radical; and $y$ is an integer; and 0.01% to 5% by weight of additive (B) which is a $C_1$ to $C_{20}$ monohydric alcohol, $C_2$ to $C_{10}$ dihydric glycol, polyhydric polyol or dihydric polyglycol, said polyglycol having the formula:

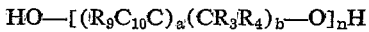

wherein $R_9$ and $R_{10}$ are hydrogen or hydrocarbyl groups and $a$, $b$, and $n$ are integers; and the combination of additive (A) and additive (B) synergistically improves said gasoline composition's anti-icing properties.

2. A composition as claimed in claim 1 wherein additive (A) is said acid or anhydride.

3. A composition as claimed in claim 2, wherein $m$ and $n$ are each integers of between 1 and 5.

4. A composition as claimed in claim 3, wherein the acid or anhydride is a polypropenyl or polyisobutenyl succinic acid or a polypropenyl succinic anhydride.

5. A composition as claimed in claim 1, wherein additive (A) is an ester derived from said hydroxy compound wherein $m=0$ and $R_2$ contains from 4 to 12 carbon atoms per molecule.

6. A composition as claimed in claim 1, wherein additive (A) is an ester derived from said hydroxy compound.

7. A composition as claimed in claim 6, wherein neither $m$ nor $n$ exceeds 5.

8. A composition as claimed in claim 1, wherein additive (A) is an amide or imide derived from said monoamine.

9. A composition as claimed in claim 1, wherein additive (A) is an amide or imide derived from said polyalkylene polyamine.

10. A composition as claimed in claim 1, wherein additive (A) is an ester, amide or imide derived from said hydroxyamine.

11. A composition as claimed in claim 10, wherein additive A is an ester, amide or imide derived from a monoalkanolamine, where $R_3$ and $R_4$ are $C_1$ to $C_9$ alkyl groups and $R_6$ is a $C_2$ to $C_{10}$ alkylene group.

12. A composition as claimed in claim 1, wherein additive (A) is an amide or imide derived from an amine of the formulae $R_3R_4NH$, where $R_3$ and $R_4$ are alkyl, alkaryl or alkenyl groups containing 1 to 25 carbon atoms, or hydroxy or amino substituted alkyl or alkaryl groups containing 1 to 25 carbon atoms, or hydrogen atoms.

13. A composition as claimed in claim 1, wherein additive (A) is an ester, amide or imide derived from a monoalkanolamine in which one or more of the alkyl groups also contains an amino substituent, preferably aminoethyl ethanolamine, amino propyl ethanolamine, or amino propyl butanolamine.

14. A composition as claimed in claim 1 wherein additive (A) is an ester represented by the formula

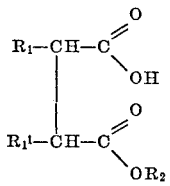

where either of the groups $R_1$ and $R_1{}^1$ is an alkenyl group containing from 10 to 30 carbon atoms, and the other of the groups $R_1$ and $R_1{}^1$ is hydrogen, and $R_2$ is a $C_4$ to $C_{12}$ alkyl group, or the group

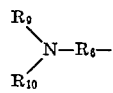

wherein $R_9$ and $R_{10}$ are $C_1$ to $C_9$ alkyl groups and $R_6$ is a $C_2$ to $C_{10}$ alkylene group, the total number of carbon atoms in the groups $R_9$, $R_{10}$ and $R_6$ being from 4 to 10.

15. A composition as claimed in claim 1, wherein additive (B) is a $C_1$ to $C_{20}$ monohydric alcohol.

16. A composition as claimed in claim 1 wherein additive (B) is a $C_2$ to $C_{10}$ dihydric glycol.

17. A composition as claimed in claim 16, wherein the glycol has an alkyl group attached to one or both carbon atoms to which a hydroxyl is attached.

18. A composition as claimed in claim 1, wherein additive (B) is said dihydride polyglycol.

19. A composition as claimed in claim 1, further including 0.000005% to 0.025% by wt. of additive (C), which is a monocarboxylic acid ester of an alkoxylated phenolaldehyde resin.

20. A composition as claimed in claim 19, wherein additive (C) is derived from a phenol substituted with a hydrocarbyl group.

21. A composition as claimed in claim 20, wherein the hydrocarbyl group contains between 1 and 30 carbon atoms.

22. A composition as claimed in claim 19, wherein the aldehyde contains less than 8 carbon atoms per molecule.

23. A composition as claimed in claim 22, wherein the aldehyde is formaldehyde or para formaldehyde.

24. A composition as claimed in claim 19, wherein additive (C) is derived from an alkylene oxide containing not more than 4 carbon atoms per molecule.

25. A composition as claimed in claim 19, wherein additive (C) is derived from a mono-carboxylic acid having between 8 and 32 carbon atoms per molecule.

26. A composition as claimed in claim 19, wherein additive (C) also incorporates a homopolymer of an alkylene oxide or a copolymer of alkylene oxides containing the residue of alkanolamine or dialkanolamine and is called additive ($C^1$).

27. A composition as claimed in claim 1, containing 0.00015% to 0.0075% by wt. of additive (A) and 0.03% to 2.0% by wt. of additive (B).

28. A gasoline additive concentrate comprising by weight 0.5% to 20.0% of additive (A), 80.0% to 99.5% of additive (B) and 0 to 1.0% inclusive of additive (C); or ($C^1$).

29. A concentrate as claimed in claim 28 further containing up to 80% by weight of a solvent.

References Cited

UNITED STATES PATENTS

| | | | |
|---|---|---|---|
| 3,589,877 | 6/1971 | Balash | 44—DIG 14 |
| 2,843,464 | 7/1958 | Gaston et al. | 44—56 D |
| 2,862,800 | 12/1958 | Cantrell et al. | 44—56 D |
| 3,035,906 | 5/1962 | Hinkamp | 44—56 D |
| 3,346,354 | 10/1967 | Kautsky et al. | 44—63 |
| 3,381,022 | 4/1968 | Le Suer | 252—56 R |
| 3,443,918 | 5/1969 | Kautsky et al. | 44—63 |
| 3,454,607 | 7/1969 | Le Suer et al | 252—51.5 A |
| 3,468,639 | 9/1969 | Lindstrom et al. | 44—56 D |
| 3,542,678 | 11/1970 | Bork | 44—66 X |
| 2,807,525 | 9/1957 | Foreman | 44—56 D |
| 2,936,223 | 5/1960 | Lovett et al. | 44—77 X |
| 3,085,867 | 4/1963 | Fareri et al. | 44—66 |
| 3,402,030 | 9/1968 | Morrison | 44—56 D |
| 3,416,902 | 12/1968 | Anderson et al. | 44—56 D |
| 3,436,195 | 4/1969 | Rosenwald et al. | 44—77 X |
| 2,995,427 | 8/1961 | Sigworth et al. | 44—66 X |
| 2,929,696 | 3/1960 | Barusch et al. | 44—66 |
| 3,082,070 | 3/1963 | Eckert | 44—66 X |
| 3,424,565 | 1/1969 | Ptacek et al. | 44—62 |

FOREIGN PATENTS

| | | | |
|---|---|---|---|
| 634,887 | 1/1962 | Canada | 44—56 D |

DANIEL E. WYMAN, Primary Examiner

W. J. SHINE, Assistant Examiner

U.S. Cl. X.R.

44—DIG 1, 62, 63, 66, 70, 71, 77